United States Patent
Ochoa et al.

(10) Patent No.: US 11,455,185 B2
(45) Date of Patent: Sep. 27, 2022

(54) SERVICE SCHEDULE OPTIMIZATION FOR BACKGROUND EXECUTION LIMITS

(71) Applicant: VMware, Inc., Palo Alto, CA (US)

(72) Inventors: Daniel Ochoa, Austin, TX (US); Nitin Sethi, Bengaluru (IN); Ashish Maan, Bengaluru (IN); Gaurav Badur Gopalkrishna, Sandy Springs, GA (US)

(73) Assignee: VMware, Inc., Palo Alto, CA (US)

( * ) Notice: Subject to any disclaimer, the term of this patent is extended or adjusted under 35 U.S.C. 154(b) by 160 days.

(21) Appl. No.: 16/712,433

(22) Filed: Dec. 12, 2019

(65) Prior Publication Data

US 2021/0182099 A1     Jun. 17, 2021

(51) Int. Cl.
| | | |
|---|---|---|
| *G06F 3/00* | (2006.01) | |
| *G06F 9/48* | (2006.01) | |
| *G06F 9/445* | (2018.01) | |
| *G06F 9/54* | (2006.01) | |

(52) U.S. Cl.
CPC ........ *G06F 9/4881* (2013.01); *G06F 9/44505* (2013.01); *G06F 9/485* (2013.01); *G06F 9/544* (2013.01); *G06F 9/546* (2013.01)

(58) Field of Classification Search
CPC .............................. G06F 9/546; G06F 9/44505
USPC ........................................................ 719/310
See application file for complete search history.

(56) References Cited

U.S. PATENT DOCUMENTS

| | | | | |
|---|---|---|---|---|
| 5,910,951 | A * | 6/1999 | Pearce | H04L 29/06 370/351 |
| 6,874,145 | B1 * | 3/2005 | Ye | H04N 5/4401 718/108 |
| 8,438,423 | B1 * | 5/2013 | Barkelew | G06F 11/1417 714/36 |
| 2005/0034124 | A1 * | 2/2005 | House | G06F 9/4825 718/100 |

(Continued)

FOREIGN PATENT DOCUMENTS

WO    WO-2006075332 A2 *   7/2006  .......... G06F 11/1482

OTHER PUBLICATIONS

John P. Lehoczkyt, An Optimal Algorithm for Scheduling Soft-Aperiodic Tasks in Fixed-Priority Preemptive Systems. (Year: 1992).*

(Continued)

*Primary Examiner* — Lechi Truong

(74) *Attorney, Agent, or Firm* — Thomas | Horstemeyer, LLP

(57) ABSTRACT

Scheduling optimizations for services are described. In one example, a priority category, such as a high, low, or other priority category, can be determined for a service of an application executing on a computing device. If the application is running as a background application on the computing device, an exception to the start of the service can be returned by the operating system of the device, due to background execution limits on the device. In that case, the start of the service can be managed by a service manager of the application based on the priority category for the service. If the priority category for the service is high, the back- (Continued)

ground application can call a foreground service. The call for the foreground service can bring the application to the foreground, and the service manager can again call for the start of the service after the foreground service is running.

17 Claims, 5 Drawing Sheets

(56) References Cited

U.S. PATENT DOCUMENTS

| | | | |
|---|---|---|---|
| 2012/0240112 A1* | 9/2012 | Nishiguchi | G06F 9/45558 718/1 |
| 2016/0132344 A1* | 5/2016 | Funk | H04L 65/4084 719/328 |
| 2016/0344604 A1* | 11/2016 | Raleigh | G06F 9/54 |
| 2018/0359764 A1* | 12/2018 | Ong | H04W 72/10 |
| 2019/0065240 A1* | 2/2019 | Kong | G06F 9/451 |
| 2020/0028788 A1* | 1/2020 | Chen | H04L 41/0896 |

OTHER PUBLICATIONS

Rohit Fernandes, Mobile MPI Programs in Computational Grids (Year: 2006).*
Phil Burk, JSyn—A Real-time Synthesis API for Java. (Year: 1998).*
Jie Yang, Predicting Next Location Using a Variable Order Markov Model (Year: 2014).*

* cited by examiner

SERVICE SCHEDULE OPTIMIZATION FOR BACKGROUND EXECUTION LIMITS

BACKGROUND

A number of different applications can execute concurrently on modern computing devices, including mobile and battery-operated devices. For example, a computing device can concurrently execute a game in one application, an internet web browser in another application, and a music player in still another application.

A service is one example of a software or application component that can execute over a period of time, in many cases, without any particular need for interactions with a user. Services, like other application objects, typically run in the main thread of a host process. One common use of a service is to act as a secondary component for execution along with other components of a main application host process, as part of the same process as the rest of the application. For example, the components of Android™ Packages (i.e., *.apk files) all run in same process unless explicitly defined otherwise, so any number of services can execute as part of the main application host process.

The execution of applications and services on a computing device results in the consumption of the resources of the computing device, such as memory, processing time, power, and other limited computing resources. Even an application executing in the background can consume computing resources although a user is not interacting with the application. This behind-the-scenes execution can negatively impact user experiences by introducing additional processing delays, contributing to battery depletion, slowing network communications, and causing other problems.

Some operating systems, particularly for mobile and other battery-operated computing devices, can impose certain limits on application background execution to help conserve computing resources. Such operating systems can make a distinction between foreground and background applications. As example, an application can be a foreground application if it presents visible objects or other activity to a display of the computing device, is executing a foreground service, or another foreground application binds to one of its services. On the other hand, if none of those conditions (among others) are met, the application can be considered a background application.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
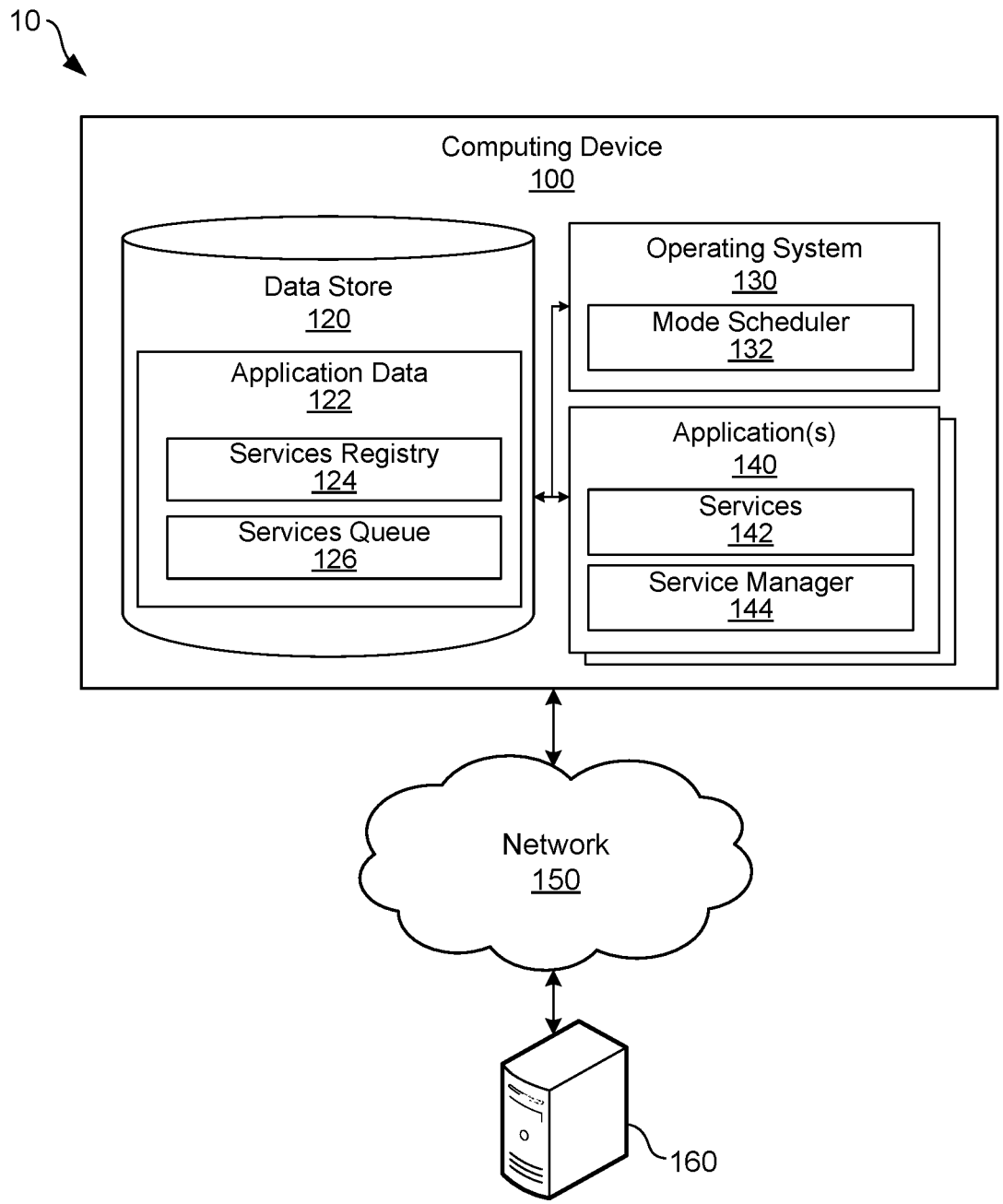
FIG. 1 illustrates an example networked environment for service schedule optimization according to various examples described herein.

As noted above, the execution of applications and services on a computing device results in the consumption of the resources of the computing device, such as memory, processing time, power, and other computing resources, which can be limited. Even an application executing in the background can consume computing resources although a user is not interacting with the application. This behind-the-scenes execution can negatively impact user experiences by introducing additional processing delays, contributing to battery depletion, slowing network communications, and causing other problems.

To mitigate the consumption of computing resources, some operating systems can impose certain limits on application background execution. Such operating systems can make a distinction between foreground and background applications. As example, an application can be a foreground application if it presents visible objects or other activity to a display of the computing device, is executing a foreground service, or another foreground application binds to one of its services. On the other hand, if none of those conditions (among others) are met, the application can be considered a background application.

Foreground applications can start and run both foreground and background services without restriction of the operating system. Background applications, on the other hand, are considered to be in idle mode if none of the following conditions are met: (1) the user explicitly launches the application, (2) the application has a process currently in the foreground (either as an activity or foreground service, or in use by another activity or foreground service), (3) the application generates a notification for display on the lock screen or in the notification tray, or (4) the application is whitelisted and given access to run in the background. Once in idle mode, the operating system can stop the background services of the application, just as if the application had itself called to stop the services.

Additionally, the operating system can place a computing device into doze mode, where the operating system attempts to conserve computing resources and battery life by restricting applications from network activity, restricting applications from starting certain services, and deferring the jobs, data synchronizations with remote servers, and standard alarms of applications. In some cases, such as in doze mode, background applications can be provided with a periodic maintenance window of time (e.g., one or more minutes) within which to start and run background services. At the end of the window, a background application is also considered to be idle by the operating system.

A background application can be placed on a temporary whitelist for a limited period of time in some cases. While the application is on the whitelist, it can launch services without restriction, and the background services of the application can run. An application can be placed on the whitelist when it handles certain tasks visible to a user, such as handling a high-priority Firebase Cloud Messaging (FCM) message, receiving a broadcast, such as a Short Messaging Service (SMS) or Multimedia Messaging Service (MMS) message, taking an action based on a notification, starting a Virtual Private Network (VPN) service, or other tasks. FCM messages are not always visible to users, however, as even some FCM messages are conditionally notified to users.

In any case, background applications can be restricted from starting certain services, particularly when a computing device is idle or in doze mode and background execution limits have been imposed by the operating system. A call to start a service in that state can result in the return of an illegal state exception, for example, or other signal from the operating system that the service cannot be invoked. The background application can resort to the use of scheduled jobs in place of services in that case. However, it may be unsuitable for an application to simply schedule jobs for tasks (rather than using a service), particularly if the operating system or other handler controls when the jobs will be executed. If necessary, the application can call to start a foreground service, which will start without the return of an illegal state exception, but the start of the foreground service can display a foreground notification to the user of the computing device. For some devices and operating systems, the start of a foreground service will always result in the presentation of a foreground notification. The display of the foreground notification can be undesirable to the user for causing a distraction in some cases. Thus, application developers may not wish to resort to the use of foreground services in all cases when background execution limits are imposed by the operating system.

In the context of the considerations outlined above, the embodiments described herein provide a mechanism to optimize the scheduling of services when background execution limits are imposed or enacted on computing devices. In one example, a priority category, such as a high, low, or other priority category, can be determined by a service manager for each service of an application executing on a computing device. The service manager can reference the priority category of each service to determine how to schedule the services, particularly when the application is running as a background application and background execution limits are imposed. In that case, a call to start a service can result in the return of an exception to the start of a service. Despite the exception, the start of the service can be further managed by the service manager of the application based on the priority category for the service.

As one example, if the priority category for the service is high, the service manager can call a foreground service. The call for the foreground service can temporarily whitelist the application so that background execution limits are no longer enforced, and the service manager can call for the start of a service. In some cases, the call for the foreground service can bring the application from the background to the foreground, and the service manager can again call for the start of a service. The service can then start without the operating system returning any exception. The service, when starting, can register in a service registry maintained by the service manager. The service can also unregister from the service registry just before it stops. The service manager can thus reference the service registry to determine whether or not the service is currently running and, when appropriate, stop the foreground service, allowing the application to again fall under background execution limits.

Alternatively, if the priority category for the service is low, the service manager can queue an intent to start the service. The intent to start the service can be queued into a deferred services queue maintained by the service manager. At some later time, the service manager can receive a notification that the background execution limits have been lifted on the computing device. For example, the service manager can receive a notification that background execution limits have been lifted when an application comes to the foreground. Background execution limits can also be lifted when a push notification is received, among other occurrences. After the background execution limits have been lifted, the service manager can call for the start of the service based on the deferred services queue.

In other alternatives, the priority category for the service can be set to bindable or system-schedulable. In those cases, the service manager can bind to the service or schedule an intent to start the service with a jobs scheduler while the background execution limits are imposed and without calling a foreground service.

In all cases, the service manager can track whether or not a foreground service has been started and which services are executing, queued for execution, bound, and scheduled for execution by the jobs scheduler. The service manager thus handles the manner in which services are started and scheduled to be started based on the priority category of each service, even when background execution limits are imposed for background applications by the operating system of the computing device.

Additional aspects of service schedule optimization to address background execution limits are described below with reference to the drawings. The drawings are representative and relied upon to provide underlying context for the concepts described herein. The concepts described herein can be implemented on other systems and devices and are not limited to the particular examples provided with reference to the drawings.

FIG. 1 illustrates an example networked environment 10 for service schedule optimization according to various examples described herein. The networked environment 10 includes a computing device 100, a network 150, and a computing environment 160. The networked environment 10 is provided as a representative example for purposes of discussion. The networked environment 10 can include other networked components not illustrated in FIG. 1.

The computing device 100 is representative of one or more computing devices. The computing device 100 can be embodied as any computing device, processing circuit, or processor based device or system, including those in the form of a mobile device, a cellular telephone, a personal digital assistant, a wearable computing device, a tablet computer, or a laptop computer, among other example computing devices and systems. As further described below, the computing device 100 can also be embodied, in part, as functional or logical (e.g., computer-readable instruction) executable elements or modules.

According to some of the examples described herein, the computing device 100 can be embodied as a battery-powered computing device that executes a mobile operating system (OS). The mobile OS can be designed to monitor and enforce the consumption of the computing resources of the computing device 100 in certain situations, such as when the computing device 100 is unplugged, operating on battery power, and left without user interactions for a period of time. However, the concepts described herein are also applicable to other types of devices, including desktop computers and other computing devices.

Depending upon its primary purpose or function, for example, the computing device 100 can include various peripheral devices or components. The peripheral devices can include input or communications devices or modules, such as keyboards, keypads, touch pads, touch screens, microphones, cameras, wireless network communications modules (e.g., cellular, infra-red, Wi-Fi®, or BLU- ETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the computing device 100.

As illustrated in FIG. 1, the computing device 100 includes a data store 120, an operating system 130, and one or more applications 140. The data store 120 includes an area for the storage of application data 122, including a services registry 124 and a services queue 126, among other types of data. The operating system 130 includes a mode scheduler 132, and the application 140 includes services 142 and a service manager 144.

The services registry 124 can include data related to the services 142 of the applications 140, such as which services 142 are running and the priority category of each of the services 142, among other data. The services queue 126 can include data related to which services 142 are scheduled to run for the applications 140. The services registry 124 and the services queue 126 can be maintained by the service manager 142, separately or collectively, for each of the applications 140.

The operating system 130 can be embodied as the operating system software of the computing device 100. Depending on the type of the computing device 100, the operating system 130 can be embodied as a mobile OS, such as the Android™ operating system of Google Inc. or the iOS® operating system of Apple, Inc., among several others currently available. The operating system 130 can also be embodied as a desktop operating system in some cases. Among other tasks, the operating system 130 is configured to establish a user interface for and manage the computing resources of the computing device 100, such as the central processing unit (CPU), working and long-term memories, input/output (I/O) peripherals, and other resources. The operating system 130 is also configured to coordinate, monitor, and control the resource usage of the processing threads of the applications 140, including any main or secondary process threads attributed to executing the services 142.

The mode scheduler 132 is a component of the operating system 130 configured to control the operating mode of the computing device 100 to conserve computing resources, including battery usage, network bandwidth, and other resources. As examples, the mode scheduler 132 is configured to determine and track which applications 140 are foreground and background applications, determine which of the applications 140 are idle, in standby, or related modes, and determine when the computing device 100 should enter doze or other modes of operation to conserve resources. The mode scheduler 132 can impose limitations on background service execution for one or more of the applications 140 when the applications 140 are determined to be background applications, idle, in standby, or when the computing device 100 is in doze mode, among other conditions. The mode scheduler 132 can also impose limitations on when the applications 140 are permitted to have access to the wireless network communications modules of the computing device 100 for network communications.

The applications 140 are representative of any applications, application extensions, or other application-related components that can be executed on the computing device 100. As examples, the applications 140 can be embodied as an e-mail clients, messaging clients, document editors or viewers, file browsers, hypertext-based network browsers, such as the Internet Explorer®, Firefox®, Chrome®, Safari®, or Silk® browsers, and other types of applications for other purposes.

Each of the applications 140 can include a number of services 142. The services 142 can be embodied as application components that can be started and stopped by the applications 140 to perform certain operations, tasks, and jobs. The services 142 of one application 140 can create interfaces for and conduct inter-process communications with other applications 140, conduct network communications over the network 150, and perform other operations with or without interactions with a user of the computing device 100. Each of the applications 140 can also include a service manager 144. The service manager 144 is configured to manage the start and oversee the execution of the services 142 as described herein. The operations of the service manager 144 are described in further detail below.

The computing environment 160 can be embodied as one or more computers, computing devices, or computing systems. In certain embodiments, the computing environment 160 can include one or more computing devices arranged, for example, in one or more server or computer banks. The computing device or devices can be located at a single installation site or distributed among different geographical locations. The computing environment 160 can include a plurality of computing devices that together embody a hosted computing resource, a grid computing resource, or other distributed computing arrangement. As described herein, the computing environment 160 can host data for access by the computing device 100 over the network 150.

The network 150 can include the Internet, intranets, extranets, wide area networks (WANs), local area networks (LANs), wired networks, wireless networks, cable networks, satellite networks, other suitable networks, or any combinations thereof. As one example, the computing device 100 and the computing environment 160 can be respectively coupled to one or more public or private LANs or WANs and, in turn, to the Internet for communication of data between each other. Although not shown in FIG. 1, the network 150 can also include network connections to any number and type of network hosts or devices, such as website servers, file servers, cloud computing resources, databases, data stores, or any other network or computing architectures.

In the networked environment 10, the computing device 100 and the computing environment 160 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

As noted above, the operating system 130 can distinguish each of the applications 140 as being either a foreground application or a background application. If an application 140 is a foreground application, it can start and run the services 142 without restriction of the operating system 130. If the application 140 is a background application, on the other hand, it can be provided with a window of time (e.g., one or more minutes) by the operating system 130 within which to start and run the services 142. At the end of the window, the operating system 130 considers the application 140 to be idle or in standby background state. At that time, the operating system 130 can then stop the services 142 of the application 140, just as if the application 140 had itself called to stop the services 142. Additionally, the operating system 130 can place a computing device 100 into doze mode, where the operating system 130 attempts to conserve computing resources and battery life by restricting the applications 140 from network activity, restricting the applications from starting the services 142, and deferring the jobs, synchronizations, and standard alarms of the applications 140.

A call by one of the applications 140 to start one of the services 142 when the application 140 is in the idle or standby background state can result in the return of an illegal state exception, for example, or other signal from the operating system 130 that the service 142 cannot be invoked or started. The application 140 can resort to the use of scheduled jobs in place of the service 142 in that case. However, it may be unsuitable for the application 140 to simply schedule jobs for tasks (rather than using the service 142), particularly if the operating system 130 or other handler controls when the jobs will be executed.

As one example, if the application 140 is an e-mail client application and a user sends an e-mail with an attachment of large size during poor wireless network conditions, it can take a significant amount of time for the related service 142 to complete the network communications required for sending the e-mail. If the user switches to another one of the applications 140 or turns the display of the computing device 100 off before the e-mail is sent, the mode scheduler 132 of the operating system 130 may place the application 140 into idle mode or place the computing device 100 into doze mode. In that case, the operating system 130 might stop the related service 142 before the e-mail is sent without any clear indication to the user. The background execution limits enforced by the operating system 130 in that case can lead to significant user frustration.

Figure 2:
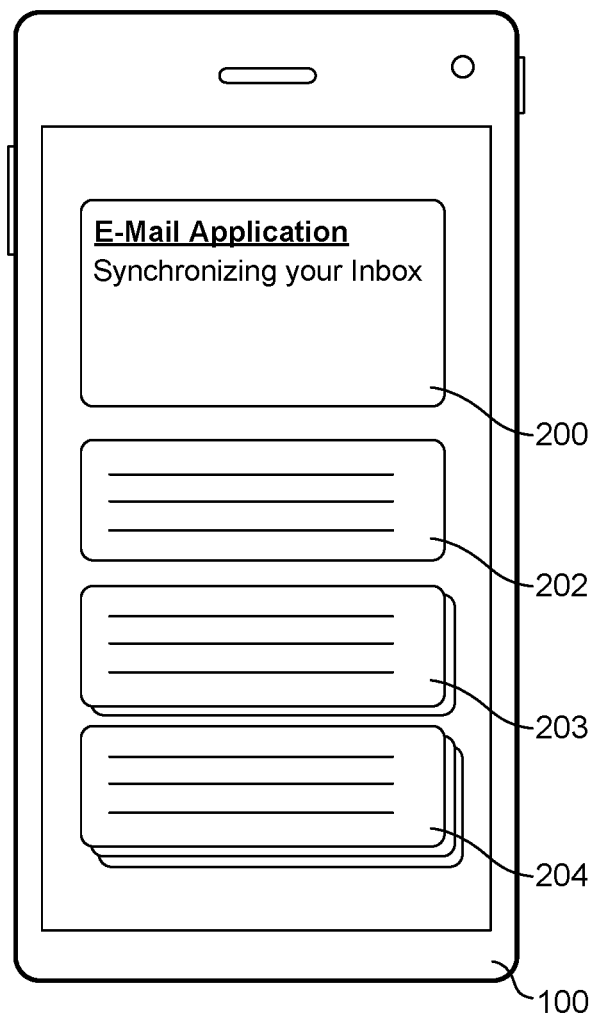
FIG. 2 illustrates an example of a foreground notification presented on a display of the computing device in the networked environment shown in FIG. 1 according to various examples described herein.

The application 140 has the ability to start a foreground service to complete the network communications required for sending the e-mail, in which case the application will come out of the idle or standby mode. Starting the foreground service, however, will display a foreground notification on a display of the computing device 100. In that context, FIG. 2 illustrates example notifications presented on a display of the computing device 100. In FIG. 2, the display of the computing device 100 is shown, with notifications 200-204 presented on the display. The notification 200 is an example of a foreground notification that would be displayed when the application 140 starts a foreground service from idle mode. The notification 200 indicates that the application 140 is conducting an inbox synchronization, for example, although other messages can be displayed. The display of the notification 200 can be undesirable to the user of the computing device 100 in some cases, for causing a distraction and needing to be cleared. Thus, application developers may not wish to resort to the use of foreground services in all cases when background execution limits are imposed by the operating system 130.

To address this problem, the concepts described herein can provide a balance between starting a foreground service to immediately execute one or more of the services 142 associated with an important or high priority task when an application 140 is subject to background execution limits. The concepts can also rely upon queueing the intent to start low priority services 142, binding to the services 142, or scheduling a job for the services 142, depending upon a priority category for each of the services 142 and other factors. In one example, the service manager 144 can determine a priority category for each of the services 142 of the application 140, such as a high, low, bindable, system-schedulable, or other priority category. The service manager 144 can reference the priority category of each service 142 to determine how to schedule the services 142, particularly when the application 140 is running as a background application and background execution limits are imposed by the operating system 130.

Thus, the service manager 144 is configured to provide a mechanism to optimize the scheduling of the services 142 when background execution limits are imposed by the operating system 130. Among other functions described herein, the service manager 144 is capable of keeping track of all the services 142 that are executing for an application 140, monitoring whether the application 140 is a foreground or background application, and starting a foreground service when the application 140 goes to the background and at least one of the services 142 is associated with a high priority category and must continue to run. The service manager 144 can also stop the foreground service (if running) when the application 140 is brought to the foreground or all the services 142 associated with a high priority category have finished executing and stopped. The service manager 144 can also queue the intent to start any of the services 142 associated with a low priority category, so that those services 142 can be launched when the application 140 is brought to the foreground. The service manager 144 can also route all calls to start services in the application 140. This ensures a single point of control to handle the lifecycle of the services 142 when the application 140 is under background execution limit restrictions.

Turning to a detailed description of the operations of the computing device 100 shown in FIG. 1, FIGS. 3-5 illustrate a process for service schedule optimization according to various examples described herein. The process is described in connection with the applications 140 and services 142 of the computing device 100, as shown in FIG. 1, but other applications and services can perform the process. Although the process diagrams show an order of operation or execution, the order can differ from that which is shown. For example, the order of execution of two or more process steps can be switched relative to the order shown and described. Also, two or more process steps shown in succession can be executed concurrently or with partial concurrence. Further, in some examples, one or more of the process steps can be skipped or omitted. Additionally, although the process is not necessarily shown as continuous, the process steps can continue in an ongoing fashion over time for the continuous scheduling of services on the computing device 100.

Figure 3:
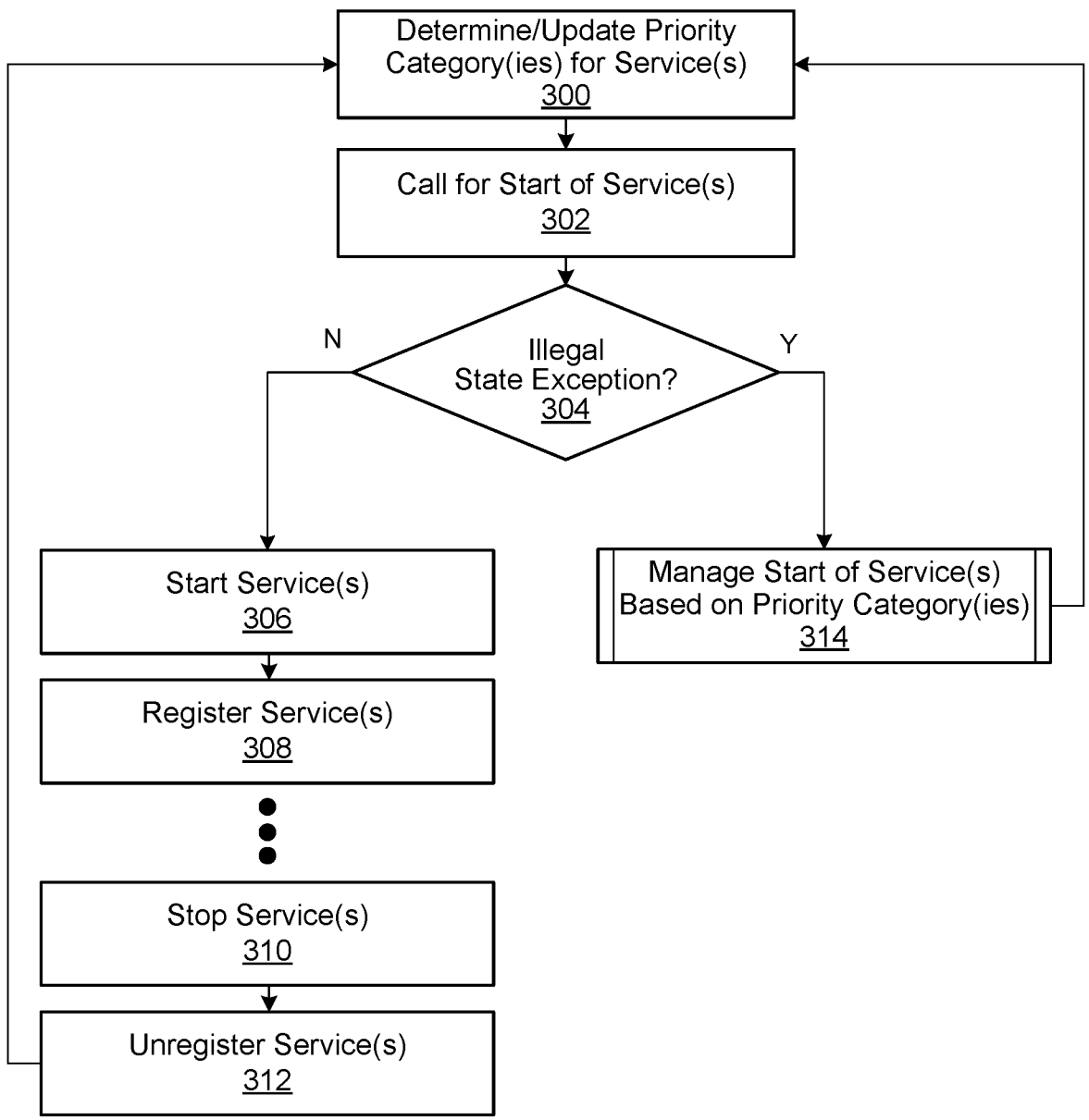
FIG. 3 illustrates a process for service schedule optimization according to various examples described herein.

Referring first to FIG. 3, at step 300, the process can include the service manager 144 determining a priority category for one or more of the services 142 of the application 140. As one example, the service manager 144 can determine the priority category for one or more of the services 142 as high priority based on a requirement for network communications. Any of the services 142 can require network communications with the computing environment 160 over the network 150, for example, for downloading or uploading e-mail attachments, to download media files for later use by a user, for synchronizing data, or for other purposes. The services 142 can also be associated with a user-directed action, such as an express intent of the user to download, upload, synchronize, or transfer data for some specific purpose. In such cases, the service manager 144 can associate a high priority category for the associated services 142. The determination of a high priority for a service 142 at step 300 is not limited to cases in which the service 142 requires network communications, as other important factors can lead to the categorization.

As another example, the service manager 144 can determine the priority category for one or more of the services 142 as low priority if the services 142 do not require network communications and can be queued for execution by the service manager 144 at a later time. As another alternative, the service manager 144 can determine the priority category for one or more of the services 142 as bindable if the service 142 does not require network communications but should be executed right away. Examples of bindable services are provided below. As still another example, the service manager 144 can determine the priority category for one or more of the services 142 as system-schedulable if the services 142 do not require network communications and can be scheduled for execution by a job scheduler directed by the operating system 130. The differences in the scheduling treatment of the individual services 142 based on the priority categories determined at step 300 are described in further detail below.

Figure 4:
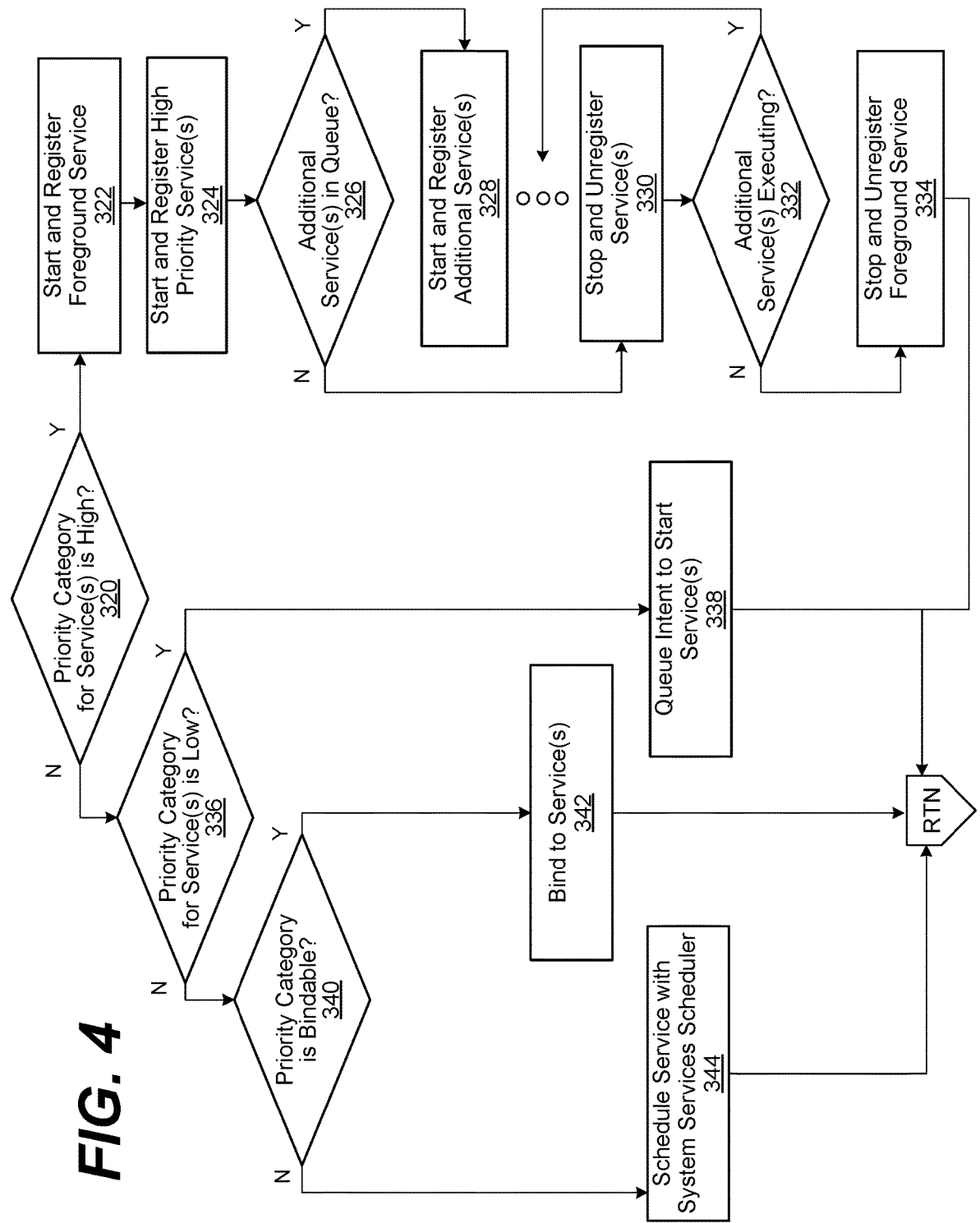
FIG. 4 illustrates a process for managing the start of services, which is part of the process shown in FIG. 3, according to various examples described herein.
Figure 5:
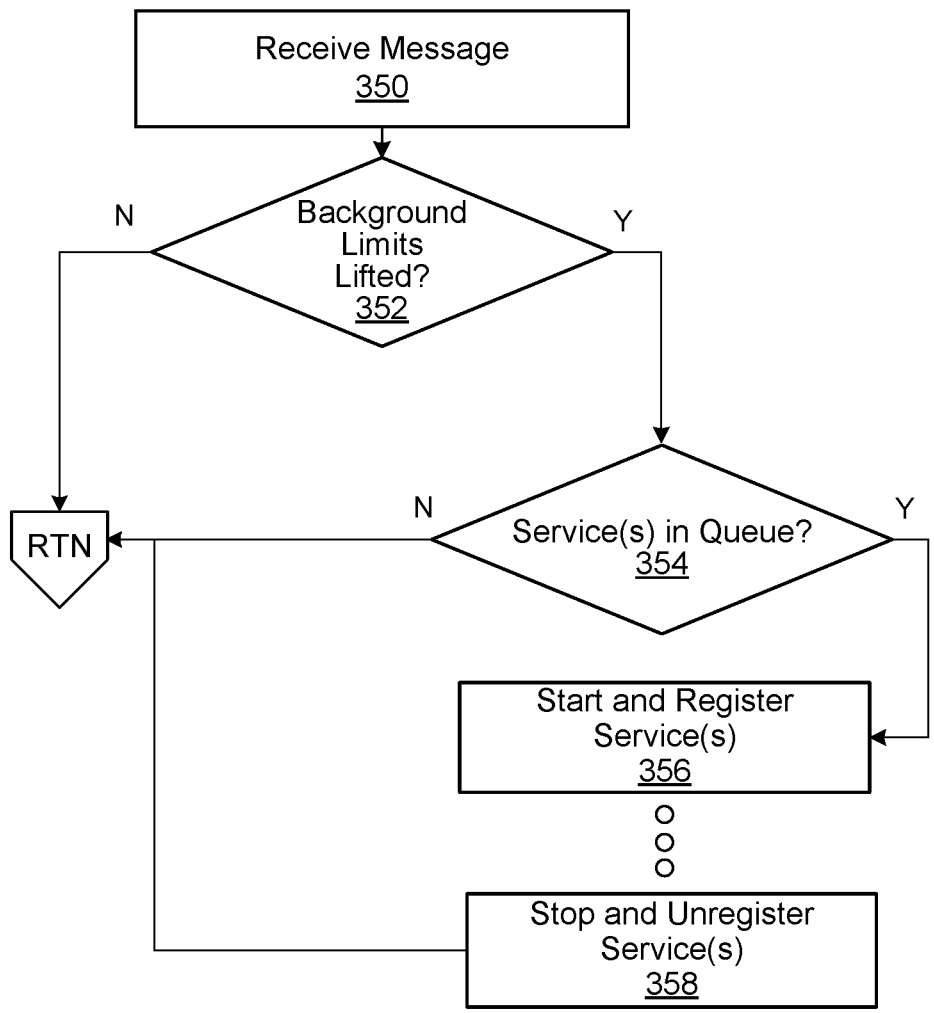
FIG. 5 further illustrates the process for service schedule optimization shown in FIG. 3 according to various examples described herein.

The determination of the priority categories for the services 142 can occur at a particular time in the process other than that shown in FIG. 3 (i.e., other than at step 300), in an ongoing fashion, periodically, or at any suitable time(s) among the steps shown in FIGS. 3-5. Additionally, the determination of the priority categories can be performed by a functional module of the application 140 other than the service manager 144, by the application 140 itself, or by another functional component of the computing device 100. Finally, the priority categories of the services 142 can be updated over and change time. The priority categories for the services 142, as determined at step 300, can also be stored in the application data 122.

At step 302, the process can include the service manager 144 calling for a start of one or more of the services 142 that are ready for and need execution. Here, rather than the application 140 directly calling for a start of the services 142, it directs the service manager 144 to do so. In the application 140, the responsibility for starting all services rests with the service manager 144, and all start service calls are routed through the service manager 144. The call to start the services 142 at step 302 is different than a call to start a foreground service, which is discussed in further detail below. Instead, the services 142 can be typical background services, and the call at step 302 can be a call to start one or more background services.

At step 304, the process can include the service manager 144 determining whether or not the operating system 130 throws an illegal state exception in response to the call at step 302. For example, if the application 140 is idle, in standby, or in another related background application mode, or if the computing device 100 is in doze mode, the operating system 130 can impose background execution limits on the application 140. In that case, the call to start the services 142 at step 302 can result in the return of an illegal state exception, for example, or other signal from the operating system 130 that the services 142 cannot be started. If the service manager 144 does not identify the return of an exception at step 304, then the process proceeds to step 306. On the other hand, if the service manager 144 does identify the return of an exception at step 304, then the process proceeds to step 314.

At step 306, when no exception is identified, the process can include starting one or more of the services 142 for execution, according to the call at step 302. In this case, the services 142 can start as standard background services without restrictions by the operating system 130. This is a typical scenario when the application 140 is not operating under background execution limits.

Services can be started in a number of ways at step 306. In one example, a service 142 can be executed though the Android™ IntentService base class. In that case, the service manager 144 can send a request to start the service 142 through a Context.startService(Intent) call. The service 142 is then started, handles each intent, in turn, using a worker thread, for example, and then stops itself when all intents are finished executing. This type of work queue pattern can be used to offload tasks, and the Android™ IntentService base class simplifies the work queue processing and mechanics.

As another example, a variation of the Android™ IntentService base class can be relied upon. This variation, referred to as a Bindable IntentService, can start the service 142 similar to the way that the IntentService base class is relied upon. For example, the service manager 144 can send a request to the Bindable IntentService to start a service 142 through an Android™ Context.startService(Intent) call. The service 142 then starts, handles each intent using a worker thread, and stops itself when all intents are finished executing. The Bindable IntentService service can handle asynchronous requests, expressed as intents, on demand. On the other hand, when the application 140 is operating in the background, the Bindable IntentService can bind another component, such as the application 140, to the service 142. The operations when the application 140 is operating in the background are described in further detail below at step 342.

As noted above, when the application 140 is executing in the foreground, the Bindable IntentService can start the service 142 through a Context.startService(Intent) call. The Bindable IntentService can then start an Android™ HandlerThread, for example, or another thread having a looper, when the service 142 is created. The Bindable IntentService can also instantiate the Android™ Handler with the Android™ HandlerThread looper. The service manager 144 can implement an interface, such as the Android™ Runnable interface, on the HandlerThread using the Handler. The Bindable IntentService is posted as a Runnable to the HandlerThread created earlier. This Runnable is created by the Bindable IntentService itself when it has been successfully connected to the client. The HandlerThread can then execute or run the Runnable and, after completing execution of the Runnable, it can unbind the client which bound with the service. The Bindable IntentService exposes an abstract method handleIntent(Intent) to the sub-classes which is called on the HandlerThread. The sub-classes implement this method to perform tasks in the background without concern for background restrictions. In this way, if the service 142 is started for any number of intents, then all the intents will be handled synchronously on the HandlerThread and each started session is stopped. When the last session is stopped, then the service 142 will be destroyed unless it is bound to a client. That is, service 142 will get destroyed if all started sessions have been stopped and no client is bound to the service 142.

At step 308, the process can include the services 142 registering with the service manager 144. As part of the registration, an identifier for each of the services 142 started at step 306, along with the priority category of each of the services, among other related data, is stored in the services registry 124 for later reference by the service manager 144. The service manager 144 can reference the services registry 124 at any time to identify which of the services 142 are currently executing and the priority category of each executing service 142.

Between steps 308 and 310, the services 142 can perform the tasks or jobs for which the services 142 were designed and called for. At step 310, the process can include stopping one or more of the services 142. The services 142 can stop when finished executing the tasks or jobs, or the application 140 can stop the services 142. In other cases, the operating system 130 can stop the services 142, such as to conserve memory or as part of the enforcement of background execution limits.

At step 312, the process can include the services 142 unregistering with the service manager 144. The service manager 144 can thus remove the data related to the services 142 from the services registry 124, because the services 142 are no longer executing. Any of the services 142 can be individually or respectively started, registered, stopped, and unregistered at steps 306, 308, 310, and 312, in various orders. The process can circle back to step 300 among steps 306, 308, 310, and 312, as services can be called to start at any time.

If the service manager 144 does identify the return of an exception at step 304, then the process proceeds to step 314. At step 314, the process can include the service manager 144 managing the start of any services 142 for which an illegal state exception was returned at step 302. In this case, the service manager 144 cannot simply start the services 142 as typical background services at step 306. Instead, the service manager 144 takes one or more other actions depending on the priority categories for the services 142 that failed to start. The process of managing the start of the services 142 at step 314 is shown in greater detail in FIG. 4.

Turning to FIG. 4, at step 320, the process can include the service manager 144 determining whether or not the priority categories of the services 142 called at step 302 in FIG. 3 are high priority. Step 320 can be processed in the case where the mode scheduler 132 of the operating system has imposed background execution limits on the computing device 100. Due to those limits, the call for the start of one or more of the services 142 at step 302 resulted in the throw of an illegal state exception. As a result of that exception (and the failure of the services 142 to start), the service manager 144 now evaluates the priority categories of the services 142 at step 320 (and at later steps) to determine whether or not to start a foreground service as described below. Step 320 can be performed individually for any number of the services 142, as each of the services 142 has been associated with or assigned a priority category at step 300. If the priority category of one or more of the services 142 is determined to be high priority at step 320, then the process proceeds to step 322. In that case, the service manager 144 will start a foreground service as described below. Otherwise, if none of the services 142 is associated with a high priority at step 320, then the process proceeds to step 336.

At step 322, the process can include the services manager 144 starting and registering a foreground service for the application 140. A foreground service is a service that performs some task, job, or other operation in a manner that is noticeable to a user of the computing device 100. A foreground service results in the display of a notification, such as the notification 200, to the user. If the application 140 was considered by the operating system 130 to be a background application before the foreground service is started at step 322, the start of a foreground service at step 322 brings the application 140 to the foreground. Thus, starting a foreground service at step 322 can allow the application 140 to start any of the services 142 without the return of an illegal state exception from the operating system 130. This can be particular useful in cases where one or more of the services 142 require network communications, but the operating system 130 is limiting network communications for background applications (or the computing device 100 is in doze mode, etc.). The services manager 144 also tracks the status of the foreground service as it is called to start, started, called to stop, and stopped. Thus, step 322 also includes the registration of the foreground service as it is called to start and started.

At step 324, the process can include the services manager 144 starting and registering one or more of the services 142. As one example, the services manager 144 can call for a start of any of the services 142 that was associated with a high priority category at step 300 in FIG. 3. Those services 142 were previously identified at step 300 as being relatively important tasks or jobs or associated with some high priority purpose (e.g., need for network communications, need to complete task based on user-request, etc.), and the services manager 144 can call for a start of those tasks at step 324. Step 324 can also include the services 142 registering with the service manager 144. As part of the registration, an identifier for each of the services 142 started at step 324, along with the priority category of each of the services, among other related data, is stored in the services registry 124 for later reference by the service manager 144.

At step 326, the process can include the services manager 144 examining the services queue 126 to determine whether or not an intent to start any of the services 142 was previously added to the services queue 126. For example, the services manager 144 can queue an intent to start any of the services 142 at step 338, as described below, if the priority category of those services 142 was determined to be low priority at step 300 in FIG. 3. After the foreground service is started at step 322 and any high priority services 142 are started at step 322, the services manager 144 can start other services 142 previously determined to have a low priority. If the services queue 126 identifies an intent (or any other indicator) to start one or more low priority services 142, then the process proceeds to step 328. Otherwise, the process proceeds to step 330.

At step 328, the process can include the services manager 144 calling for a start of any services 142 identified in the services queue 126. In this way, the start of the foreground service at step 322, for even one high priority service 142, can result in the execution of other, lower, priority services which were queued for execution at a later time. At step 328, the process can also include the services 142 registering with the service manager 144. As part of the registration, an identifier for each of the services 142 started at step 328, along with the priority category of each of the services, among other related data, is stored in the services registry 124 for later reference by the service manager 144.

Between steps 328 and 330, the services 142 started at step 324 and step 328 can perform the tasks or jobs for which the services 142 were designed and called for. At step 330, the process can include stopping one or more of the services 142 started at step 324 and step 328. The services 142 can stop when finished executing the tasks or jobs, or the application 140 can stop the services 142. In other cases, the operating system 130 can stop the services 142, such as to conserve memory or as part of the enforcement of background execution limits. At step 330, the process can also include the services 142 unregistering with the service manager 144. The service manager 144 can thus remove the data related to the services 142 from the services registry 124, because the services 142 are no longer executing.

At step 332, the process can include the services manager 144 determining whether or not any services 142 are still executing. As one example, the services manager 144 can reference the services registry 124 to determine whether any services are still registered, which is an indication that service processes are still ongoing. If one or more of the services 142 are still executing at step 332, then the process proceeds back to allow the execution of those services to continue. Otherwise, if all of the services 142 have finished execution and unregistered from the services registry 124, then the process proceeds to step 334.

At step 334, the process can include the services manager 144 stopping and unregistering the foreground service that was started at step 322. The services manager 144 can stop the foreground service at step 334 when no high priority, queued, or other services 142 are still executing. The services manager 144 can also stop the foreground service if the services manager 144 is notified that the background execution limits have been lifted (e.g., at steps 350 and 352 in FIG. 5). The services manager 144 can also track the status of the foreground service as it is called to stop and is stopped. After step 334, the application 140 can fall back to a background application.

Referring back to step 320, the services manager 144 can determine that none of the services 142 are associated with a high priority category at step 320. As described above, the services 142 can be associated with priority categories other than high priority, such as low priority, bindable, and system-schedulable, among others. Thus, in some cases, none of the services 142 may be associated with a high priority category, and the process can proceed from step 320 to step 336. In that case, the service manager 144 can be configured to schedule the services 142 for execution in various ways, rather than calling for the start of a foreground service at step 322 as described above. The start of a foreground service will display a foreground notification to the user of the computing device 100 and can be undesirable to the user for causing a distraction. Thus, the state of a foreground service 142 is not suitable in all cases when background execution limits are imposed by the operating system 130.

At step 336, the process can include the service manager 144 determining whether or not the priority categories of the services 142 called at step 302 in FIG. 3 are low priority. Step 320 can be performed individually for any number of the services 142, as each of the services 142 has been associated with or assigned a priority category at step 300 in FIG. 3. The process proceeds to step 338 for any of the services 142 having a low priority. Otherwise, the process proceeds to step 340 for any of the services 142 that have not been assigned a low priority (i.e., for any services not assigned to a high or low priority category).

At step 338, the process includes the service manager 144 queuing an intent to start any of the services 142 having a low priority. The service manager 144 can queue an intent to start the services 142 having low priority by updating the services queue 126 to include an identifier of those services 142, the priority categories of those services 142, and any other relevant data. The service manager 144 can call to start the services 142 identified in the services queue 126 the next time that a foreground service is started (e.g., at steps 326 and 328, described above).

At step 340, the process can include the service manager 144 determining whether or not the priority categories of the services 142 called at step 302 in FIG. 3 are bindable priority. If so, then the process proceeds to step 342. If not, then the process proceeds to step 344. The determination at step 340 can be performed individually for any number of the services 142. As described above, services 142 associated with a high priority result in the start of a foreground service at step 322, and services associated with a low priority result in a queue of an intent to start those low priority services at step 338. Apart from those cases, services 142 associated with a bindable priority do not result in either the start of a foreground service or the queue of an intent.

A bindable priority may be assigned (e.g., at step 300 in FIG. 3) to any of the services 142 that do not require network communications but must be executed right away. Services 142 associated with the bindable priority are not called to start directly. Instead, at step 342, the application binds to those services 142. A service, including any of the services 142, is bound when the application 140 or another active component binds to it. The services 142 can be bound to allow other components to interact with the services 142, send requests, receive results, and conduct inter-process communications (IPC). Bound services execute only as long as other applications or activities are bound to then. Multiple activities or components can bind to a service at once. When the activities or components all unbind from the service, the service can be destroyed.

Even if the application 140 is a background application and operating under background execution limits, the application 140 can still bind to one or more of the services 142 at step 342. In that context, rather than directly calling to start the services 142, which can result in the return of an illegal state exception from the operating system 130, the application 140 can bind to the services 142 that are associated with the bindable priority at step 342. Either the application 140 can bind to the services 142 or some component of the application 140 can bind to the services 142 at step 342. The operating system 130 makes a distinction between a direct call to start the services 142 and binding to the services 142. The operating system 130 will not return an illegal state exception if the application 140 binds to one of the services 142, even when operating under background execution limits. Thus, binding to a service 142 at step 342 is different than a direct call to start the service 142, does not return an illegal state exception even under background execution limits, and causes the service 142 to execute right away.

As another example, the service 142 can be bound at step 340 using the bindable intent service described above with reference to step 306. In this case, because the application 140 is operating in the background, the bindable intent service can bind another component, such as the application 140, to the service 142. The service manager 144 can pass BinderServiceConnection as ServiceConnection.onBind( ) of the Service is called which returns AbstractBindableServiceBinder. This Binder is received by onServiceConnected of BinderServiceConnection which calls AbstractBindableServiceBinder #handleIntent( ) once the service has been connected. This calls AbstractBindableIntentService #executeJob( ) which will post the Runnable to execute the task in background. Once the task has been performed by the sub-class then it will unbind the service connection. This allows sub-classes to perform tasks in same way as the service 142 was started. Thus, sub-classes do not need to track whether the service 142 was started or bound. Once a sub-class has performed a task based on an intent, it will unbind the ServiceConnection to the Service. For each bindService( ) a new ServiceConnection is created and it will post a Runnable to the HandlerThread looper queue. For multiple bindService( ) calls for the same service 142, the intents can be handled synchronously on the Android™ HandlerThread. When the last ServiceConnection in unbound then the service 142 will be destroyed.

For any processes not associated with the bindable priority, the process proceeds from step 340 to step 344. According to one example described herein, each of the services 142 is associated with one of the following priority categories: high priority, low priority, bindable priority, or system-schedulable priority. By the process of elimination, if any service 146 is not associated with the high priority at step 320, not associated with the low priority at step 336, and not associated with the bindable priority at step 340, then the service 146 is associated with the system-schedulable priority. In that case, the process proceeds to step 344. It is noted, however, that other types and hierarchies of priorities can be used, and the concepts described herein are not limited to any particular categorization of the services 142.

For any of the services 142 associated with system-schedulable priority, the process proceeds to step 344. At step 344, the services manager 144 can schedule the system-schedulable priority services 142 with a jobs scheduler handled by the operating system 130. In this case, the service manager 144 can pass the responsibility for when the services 142 will be executed to the operating system 130. This may be suitable for very low priority tasks. After either step 334, 338, 342, or 344, the process in FIG. 4 can return to step 300 in FIG. 3 or at any other suitable position in the process.

Other aspects of the process for service schedule optimization are shown in FIG. 5. At step 350, the process can include the service manager 144 receiving a notification. The notification can include a high-priority Firebase Cloud Messaging (FCM) message, a broadcast, such as a Short Messaging Service (SMS) or Multimedia Messaging Service (MMS) message, an action based on a notification, or other notification. The notification at step 350 can be related or associated with whether or not the background execution limits imposed by the operating system 130 for the application 140 have been lifted.

At step 352, the process can include the service manager 144 determining whether or not the background execution limits imposed by the operating system 130 for the application 140 have been lifted based on the notification received at step 350. If so, the process proceeds to step 354. Otherwise, the process can return to another suitable location in the process, such as step 300 in FIG. 3.

At step 354, the process can include the services manager 144 examining the services queue 126 to determine whether or not an intent to start any of the services 142 was previously added to the services queue 126. For example, the services manager 144 can queue an intent to start any of the services 142 at step 338 (FIG. 4), as described above, if the priority category of those services 142 was determined to be low priority at step 300 (FIG. 3). If the services manager 144 determines that the application 140 is no longer executing under background execution limits at step 352, the services manager 144 can start any of the services 142 previously determined to have a low priority.

At step 356, the process can include the services manager 144 calling for a start of any services 142 identified in the services queue 126. In this way, services manager 144 can start any services 142 which were queued for execution at a later time. At step 356, the process can also include the services 142 registering with the service manager 144. As part of the registration, an identifier for each of the services 142 started at step 356, along with the priority category of each of the services, among other related data, is stored in the services registry 124 for later reference by the service manager 144.

Between steps 356 and 358, the services 142 started at step 356 can perform the tasks or jobs for which the services 142 were designed and called for. At step 356, the process can include stopping one or more of the services 142 started at step 356. The services 142 can stop when finished executing the tasks or jobs, or the application 140 can stop the services 142. In other cases, the operating system 130 can stop the services 142, such as to conserve memory or as part of the enforcement of background execution limits. If any high priority services 142 are stopped by the operating system 130, the services manager 144 can start a foreground service (e.g., at step 322 in FIG. 3) to resume or maintain (e.g., within the maintenance window) the execution of those services 142. At step 358, the process can also include the services 142 unregistering with the service manager 144. The service manager 144 can thus remove the data related to the services 142 from the services registry 124, because the services 142 are no longer executing.

Thus, as described above, the services manager 144 can manage the execution of the services 142 in various ways based on the priority categories for the services 142. If necessary for high priority services, a foreground service can be started at step 322 in FIG. 4. Alternatively, one or more of the services 142 can be queued for execution at step 338, and those services 142 can be executed at step 328 after a foreground service is started at step 322. Queued services 142 can also be executed after background execution limits have been lifted at step 356 in FIG. 5. Further, the services manager 144 can bind to one or more of the services 142 at step 342 in FIG. 4 or schedule a job for one or more of the services 142 at step 344. The process steps illustrated in FIGS. 3-5 can continue in an ongoing fashion over time to manage the execution of the services 142 depending on whether or not background execution limits are imposed by the operating system 130 and the priority categories of the services 142. It is also noted that the priority categories of the services 142 can be changed or updated at step 300 in FIG. 3 over time, as that process step can be returned to at various times in the process flow.

The flowcharts in FIGS. 3-5 show examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing device 100 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, the computing device 100 can include at least one processing circuit. Such a processing circuit can include, for example, one or more processors and one or more storage or memory devices coupled to a local interface.

The storage or memory devices can store data or components that are executable by the processors of the processing circuit. For example, the operating system 130, the application 140, and other components can be stored in one or more storage devices and be executable by one or more processors in the computing device 100. The operating system 130, the application 140, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the operating system 130, the application 140, and other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for service schedule optimization in a computing device, comprising:
   determining a priority category for a service of an application executing on the computing device;
   calling, by a service manager of the application, for a start of the service as a background service of the application;
   identifying a state exception to the start of the service as a background service in response to calling for the start of the service, the state exception being due to background execution limits on the computing device; and
   responsive to the state exception, managing the start of the service of the application based on the priority category for the service, wherein managing the start of the service comprises:
   calling a foreground service based on the priority category of the service;
   calling for the start of the service after the foreground service is running; and
   registering the service and the priority category for the service in a service registry.

2. The method according to claim 1, wherein managing the start of the service further comprises:
   unregistering the service from the service registry based on a stop of the service;
   determining that the service registry does not identify any running service having a high priority; and
   stopping the foreground service.

3. The method according to claim 1, wherein managing the start of the service further comprises:
   queueing an intent to start the service into a deferred services queue based on the priority category of the service;
   receiving a notification that the background execution limits have been lifted on the computing device; and
   calling for the start of the service after the background execution limits have been lifted based on the deferred services queue.

4. The method according to claim 1, wherein determining the priority category for the service comprises setting the priority category to high based on a requirement of the service for network activity.

5. The method according to claim 1, wherein determining the priority category for the service comprises setting the priority category to high based on a user interaction associated with the service.

6. The method according to claim 1, wherein determining the priority category for the service comprises setting the priority category to one of low, bindable, or system-schedulable.

7. The method according to claim 1, wherein:
   determining the priority category for the service comprises setting the priority category to bindable based on a need for the service to run immediately with no requirement for network activity; and
   managing the start of the service comprises binding to the service.

8. The method according to claim 1, wherein:
   determining the priority category for the service comprises setting the priority category to system-schedulable based on no need for the service to run immediately and no requirement for network activity; and
   managing the start of the service comprises scheduling an intent to start the service with a system service scheduler.

9. A non-transitory computer-readable medium embodying program code for service schedule optimization that, when executed by a computing device, directs the computing device to at least:
   determine a priority category for a service of an application executing on the computing device;
   call, by a service manager of the application, for a start of the service as a background service of the application;
   identify a state exception to the start of the service as a background service in response to calling for the start of the service, the state exception being due to background execution limits on the computing device; and responsive to the state exception, manage the start of the service of the application based on the priority category for the service, wherein managing the start of the service comprises:

calling a foreground service based on the priority category of the service;

calling for the start of the service after the foreground service is running; and registering the service and the priority category for the service in a service registry.

10. The non-transitory computer-readable medium according to claim 9, wherein, to manage the start of the service, the computing device is further directed to:

unregister the service from the service registry based on a stop of the service;

determine that the service registry does not identify any running service having a high priority; and stop the foreground service.

11. The non-transitory computer-readable medium according to claim 9, wherein, to manage the start of the service, the computing device is further directed to:

queue an intent to start the service into a deferred services queue based on the priority category of the service;

receive a notification that the background execution limits have been lifted on the computing device; and call for the start of the service after the background execution limits have been lifted based on the deferred services queue.

12. The non-transitory computer-readable medium according to claim 9, wherein, to determine the priority category for the service, the computing device is further directed to set the priority category to high based on at least one of a requirement of the service for network activity or a user interaction associated with the service.

13. The non-transitory computer-readable medium according to claim 9, wherein, to determine the priority category for the service, the computing device is further directed to set the priority category to one of low, bindable, or system-schedulable.

14. The non-transitory computer-readable medium according to claim 9, wherein the computing device is further directed to:

set the priority category for the service to bindable based on a need for the service to run immediately with no requirement for network activity; and bind to the service.

15. A computing device for service schedule optimization, comprising:

a memory device configured to store computer-readable instructions thereon; and at least one processing device configured, through execution of the computer-readable instructions, to direct the computing device to at least:

determine a priority category for a service of an application executing on the computing device;

call, by a service manager of the application, for a start of the service as a background service of the application;

identify a state exception to the start of the service as a background service in response to calling for the start of the service, the state exception being due to background execution limits on the computing device; and responsive to the state exception, manage the start of the service of the application based on the priority category for the service, wherein managing the start of the service comprises:

calling a foreground service based on the priority category of the service;

calling for the start of the service after the foreground service is running; and registering the service and the priority category for the service in a service registry.

16. The computing device according to claim 15, wherein, to manage the start of the service, the computing device is further directed to:

unregister the service from the service registry based on a stop of the service;

determine that the service registry does not identify any running service having a high priority; and stop the foreground service.

17. The computing device according to claim 15, wherein, to manage the start of the service, the computing device is further directed to:

queue an intent to start the service into a deferred services queue based on the priority category of the service;

receive a notification that the background execution limits have been lifted on the computing device; and call for the start of the service after the background execution limits have been lifted based on the deferred services queue.

* * * * *